United States Patent [19]

Mitsumoto

[11] Patent Number: 4,998,518
[45] Date of Patent: Mar. 12, 1991

[54] SWIRL CONTROL SYSTEM FOR LEAN-BURN ENGINES

[75] Inventor: Hisashi Mitsumoto, Kanagawa, Japan

[73] Assignee: Nissan Motor Co., Ltd., Yokohama, Japan

[21] Appl. No.: 524,427

[22] Filed: May 17, 1990

[30] Foreign Application Priority Data

May 17, 1989 [JP] Japan .................................. 1-125342

[51] Int. Cl.$^5$ ............................................ F02B 31/00
[52] U.S. Cl. ................................... 123/306; 123/1 A; 123/188 M
[58] Field of Search .................. 123/1 A, 188 M, 306, 123/308

[56] References Cited

U.S. PATENT DOCUMENTS

| | | | |
|---|---|---|---|
| 4,318,386 | 3/1982 | Showalter et al. | 123/188 M X |
| 4,753,200 | 6/1988 | Kawamura et al. | 123/188 M |
| 4,823,753 | 4/1989 | Murakami et al. | 123/188 M X |
| 4,909,210 | 3/1990 | Shimada et al. | 123/188 M X |
| 4,942,848 | 7/1990 | Terasaka | 123/1 A |

FOREIGN PATENT DOCUMENTS

| | | |
|---|---|---|
| 61-192811 | 8/1986 | Japan . |
| 61-151037 | 9/1986 | Japan . |
| 61-272418 | 12/1986 | Japan . |
| 62-63128 | 3/1987 | Japan . |
| 62-79936 | 4/1987 | Japan . |

Primary Examiner—Tony M. Argenbright
Attorney, Agent, or Firm—Foley & Lardner, Schwartz, Jeffery, Schwaab, Mack, Blumenthal & Evans

[57] ABSTRACT

A swirl control system for a lean-burn engine, utilizing composite fuel blended with at least two different liquid fuels, comprises sensors for monitoring the operating state of the engine, a concentration meter for monitoring a mix proportion of one of the blended liquid fuels included in the composite fuel, and a control valve disposed in the vicinity of an intake port through which intake air is introduced via an intake air passage defined in an intake manifold of the engine into a combustion chamber of the engine. To vary a swirl mode of the swirl occurring in the combustion chamber, the swirl control valve is opened or closed by a controller on the basis of the present operating state of the engine and the mix proportion detected by the concentration meter.

6 Claims, 5 Drawing Sheets

SWIRL CONTROL SYSTEM FOR LEAN-BURN ENGINES

BACKGROUND OF THE INVENTION

1. Field of the Invention

The present invention relates to a swirl control system for, so called, lean-burn engines. Specifically to a swirl control system for lean-burn engines, utilizing composite fuel blended with at least two different liquid fuels, such as gasoline and alcohol.

2. Description of the Prior Disclosure

Recently, there have been proposed and developed various lean-burn engines employing a swirl control system so as to assure optimal combustion in accordance with the different operating states of the engine, for example the magnitude of engine load and/or engine speed. As is generally known, swirl occurring in each combustion chamber of a multi-cylinder lean-burn engine prevents deterioration in combustion efficiency due to a leaner air-fuel gas mixture having a relatively high proportion of air and a low proportion of fuel, i.e., a leaner gas mixture than that of the stoichiometric air-fuel ratio or due to an excessive amount of exhaust-gas recirculated into the combustion chambers through an exhaust-gas recirculation (EGR) system. However, if the intensity of the swirl is excessively increased during high engine revolutions, the amount of intake air entering the combustion chambers is lowered due to excessively increased flow resistance of swirling air introduced into an intake port behind the intake valve of the engine and a lowering in density of the introduced air, thereby resulting in lower engine output. For this reason, a swirl control system is required for adjusting the intensity of swirl in response to the engine operating state.

Such conventional swirl control systems have been disclosed in Japanese Patent First Publications (Tokkai) Showa 61-192811, 61-272418 and 62-63128, and Japanese Utility Model First Publications (Jikkai) Showa 61-151037 and 62-79936. One such conventional swirl control system for internal combustion engines includes an intake air flow passage divided, upstream of an intake port, into a main intake air passage and an auxiliary intake air passage defining a relatively narrow flow passage helically shaped so as to facilitate swirling motion. The prior art swirl control system also includes a swirl control valve disposed in the main intake air passage for controlling the intensity of swirl occurring in the combustion chamber in such a manner as to open or close the main intake air passage. For example, when the engine is operated in a low or medium load state, the swirl control valve is closed, thereby resulting in a strong swirl in the combustion chamber. Such strong swirl improves combustion in lean-burn engines during low or medium engine load and consequently improves the specific fuel consumption of the engine.

When the engine is in a high load state, the swirl control valve is opened and as a result a charging efficiency of intake air is enhanced to assure higher engine output.

Just after engine starting, when a very rich air-fuel mixture is required for optimal combustion, the swirl control valve is opened so as to prevent fuel flowing through an inner wall of the combustion chamber from adhering to the ignition plug.

However, since previously described conventional swirl control systems are so tuned as to be suitable for internal combustion engines utilizing only gasoline as liquid fuel, such a swirl control system would not be suitable for internal combustion engines utilizing composite fuel blended with at least two different liquid fuels, for example methanol-gasoline blends, ethanol-gasoline blends or the like, because such a composite fuel exhibits specific fuel consumption characteristics considerably different from gasoline. The specific fuel consumption is dependent on a mix proportion between two different liquid fuels as mentioned above. Therefore, if the swirl control system so tuned as to be suitable for lean-burn engines utilizing only gasoline is used for lean-burn engines possibly utilizing various mix proportions of composite fuels, at low or medium engine load conditions, an optimal lean-burn cannot be obtained, thereby resulting in unstable combustion in the combustion chambers. As a result, specific fuel consumption, emission performance, and driveability performance of the engine, such as startability and warm-up performance are deteriorated. In order to overcome the problems of the prior systems and increase the performance efficiency of swirl control systems, there is herein proposed an improved swirl control system which can provide optimal lean-burn in response to the specific mix proportion of the composite fuel used for a lean-burn engine.

SUMMARY OF THE INVENTION

It is, therefore in view of the above disadvantages, an object of the present invention to provide a swirl control system for lean-burn engines, utilizing composite fuel blended with at least two different liquid fuels, such as gasoline and alcohol, wherein the intensity of swirl can be controlled in response to the mix proportion of one liquid fuel included in the composite fuel, during low or medium engine load.

It is another object of the invention to provide a swirl control system having an improved specific fuel consumption, optimal emission performance, and driveability performance for lean-burn engines.

In order to accomplish the aforementioned and other objects, a swirl control system for a lean-burn engine, utilizing composite fuel blended with at least two different liquid fuels, comprises first means for monitoring an operating state of the engine, second means for monitoring a mix proportion of one of the blended liquid fuels included in the composite fuel, a control valve disposed in the vicinity of an intake port through which intake air is introduced via an intake air passage defined in an intake manifold of the engine into a combustion chamber of the engine, the control valve provided for varying a swirl mode of swirl occurring in the combustion chamber in such a manner as to open or close a portion of the intake air passage and, swirl control means for controlling an opening angle of the control valve on the basis of the engine operating state monitored by the first means and the mix proportion monitored by the second means.

According to another aspect of the invention, a swirl control system for a lean-burn engine, utilizing alcohol-gasoline blended liquid fuel, comprises first means for monitoring an operating state of the engine, second means for monitoring a mix proportion of alcohol in the alcohol-gasoline blend, a control valve disposed in the vicinity of an intake port through which intake air is introduced via an intake air passage defined in an intake manifold of the engine into a combustion chamber of the engine, the control valve provided for varying a swirl mode of swirl occurring in the combustion chamber in such a manner as to open or close a portion of the intake air passage, and swirl control means for controlling an opening angle of the control valve on the basis of the engine operating state monitored by the first means and the mix proportion monitored by the second means. The control means controls the opening angle of the control valve, such that when the engine is in a high load state or when the engine is in a low or medium load state and the proportion of alcohol included in the alcohol-gasoline blend is greater than a preset value, the control valve is opened to provide a first swirl mode wherein a relatively low intensity of swirl occurs. The control means also controls the opening angle of the control valve such that, when the engine is in the low or medium load state and the mix proportion of alcohol is less than the preset value, the control valve is closed to provide a second swirl mode wherein a relatively high intensity of swirl occurs.

According to a further aspect of the invention, a swirl control system for a lean-burn engine, utilizing alcohol-gasoline blended liquid fuel, comprises first means for monitoring an operating state of the engine, second means for monitoring a mix proportion of alcohol in the alcohol-gasoline fuel blend, a control valve disposed in the vicinity of an intake port through which intake air is introduced via an intake air passage defined in an intake manifold of the engine into a combustion chamber of the engine, the control valve provided for varying a swirl mode of swirl occurring in the combustion chamber in such a manner as to open or close a portion of the intake air passage, a temperature sensor for monitoring a cooling water temperature of water used to cool the engine, and swirl control means for controlling an opening angle of the control valve on the basis of the engine operating state monitored by the first means, the mix proportion monitored by the second means and the cooling water temperature monitored by the temperature sensor. The control means controls the opening angle of the control valve, such that when the engine is in a high load state or when the engine is in a low or medium load state and the mix proportion of alcohol included in the alcohol-gasoline blend is greater than a preset value and the cooling water temperature is greater than a preset temperature, the control valve is opened to provide a first swirl mode wherein a relatively low intensity of swirl occurs. The control means also controls the opening angle of the control valve, when the engine is in the low or medium load state and the mix proportion of alcohol is less than the preset value or when the engine is in the low or medium load state and the mix proportion of alcohol is greater than the preset value and the cooling water temperature is less than the preset temperature, the control valve is closed to provide a second swirl mode wherein a relatively high intensity of swirl occurs.

A method for controlling a swirl mode of swirl occurring in a combustion chamber of a lean-burn engine utilizing alcohol-gasoline blended liquid fuel, according to the invention comprises the steps of (a) determining whether the engine is in a low or medium load state, (b) deriving a mix proportion of alcohol included in the alcohol-gasoline blend, (c) determining whether the mix proportion of alcohol is greater than a preset value, (d) deriving a cooling water temperature of water used to cool the engine, (e) determining whether the cooling water temperature is greater than a preset temperature, (f) opening a control valve disposed in the vicinity of an intake port through which intake air is introduced via an intake air passage defined in an intake manifold of the engine into the combustion chamber, so as to open a portion of the intake air passage, when the engine is in a high load state or when the engine is in a low or medium state and the mix proportion of alcohol included in the alcohol-gasoline blend is greater than the preset value and the cooling water temperature is greater than the preset temperature, and (g) closing the control valve so as to close the portion of the intake air passage, when the engine is in the low or medium load state and the mix proportion of alcohol is less than the preset value or when the engine is in the low or medium load state and the mix proportion of alcohol is greater than the preset value and the cooling water temperature is less than the preset temperature.

DESCRIPTION OF THE PREFERRED EMBODIMENTS

Figure 1:
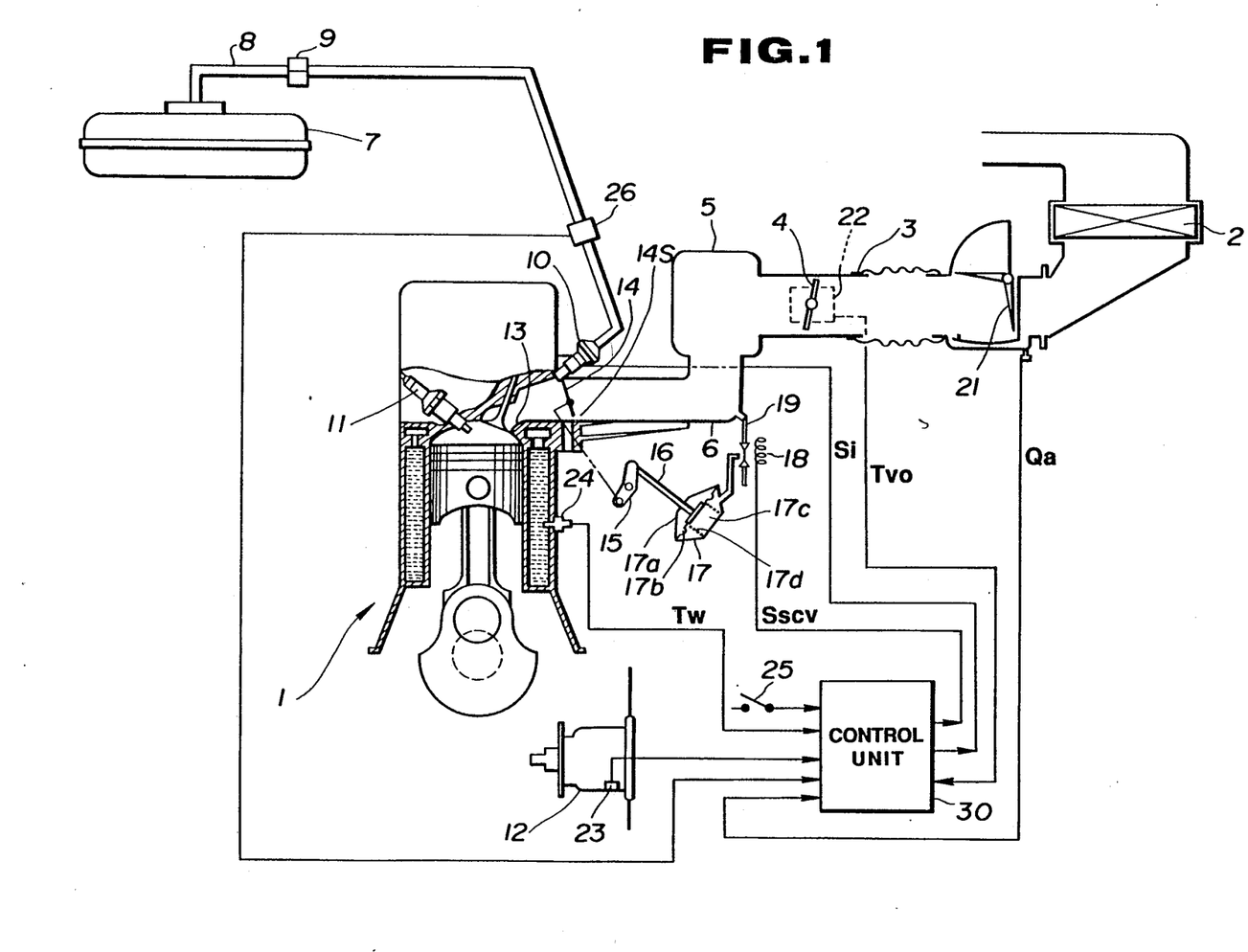
FIG. 1 is a system diagram illustrating one embodiment of a swirl control system for lean-burn engines according to the invention.

Referring now to FIG. 1, there is shown a traditional fuel-injection type of water cooled engine 1, utilizing composite fuel blended of, for example, alcohol and gasoline. Intake air is introduced from an air cleaner 2 through an air intake duct 3, a throttle valve 4 and a surge tank 5 to each air intake branch pipe of an intake manifold 6. On the other hand, composite fuel, such as an alcohol-gasoline blend is supplied from a fuel tank 7 through a fuel-supply line 8 and a fuel filter 9 to injectors 10 by means of an electric fuel-supply pump (not shown). Each nozzle of the injectors 10 is directed into an intake port 13 behind the intake valve such that the fuel is injected into the intake port 13 at a predetermined timing responsive to a signal $S_i$ output from a control unit 30 described herein in detail.

An ignition system is provided for furnishing high-voltage sparks to the engine cylinders to fire the compressed air-fuel charges. Although it is not shown for the purpose of simplification of the disclosure, the ignition system traditionally includes the battery, ignition coil, ignition switch and wiring. The ignition system also includes ignition plugs 11 for providing a spark gap in the associated cylinder and an ignition distributor 12 for opening and closing the circuit to the ignition coil with correct timing and for distributing the high-voltage surges from the ignition coil to the proper ignition plugs.

A swirl control system according to the invention includes a swirl control valve 14 for controlling the intensity of swirl occurring in the combustion chamber of the engine and a diaphragm-type vacuum actuator 17 for opening and closing the swirl control valve. The swirl control valve 14 is disposed in the vicinity of and upstream of the intake port 13 in such a manner as to restrict a portion of intake air flowing through an intake air flow passage. In this swirl control valve arrangement, when the valve 14 is fully closed, a relatively small amount of intake air is introduced into the intake port 13 through a relatively narrow flow passage 14s eccentrically offset from the center of the intake air flow passage. The eccentric narrow flow passage 14s is defined between the end surface of the swirl control valve 14 and the inner wall of the intake manifold 6. The eccentric narrow flow passage 14s facilitates strong swirling motion of the intake air introduced through the intake port 13 into the combustion chamber and increases velocity of the intake air flow. This assures faster combustion speed of the air-fuel mixture. Particularly, during low or medium engine load, combustion in lean-burn engines is improved.

The vacuum actuator 17 includes an actuator housing 17a and an actuating diaphragm 17b disposed in the housing 17a in such a manner as to divide an internal space defined in the housing 17a into two chambers. One of the chambers is sealed so as to define a vacuum chamber 17c. The actuator 17 also includes an actuating lever 15 serving as a bell-crank and an actuating shaft 16 supported slidably by the housing 17a in such a manner as to project outside of the housing 17a. One end of the lever 15 is connected through a linkage indicated by a dotted line to the swirl control valve 14, and the other end is connected to one end of the shaft 16. The other shaft end is fixed to a spring seat disposed essentially in the center of the diaphragm 17b. A spring 17d is provided in the vacuum chamber 17c for normally biasing the diaphragm 17b in one direction in such a manner as to hold the shaft 16 in the outermost position. The spring 17d is operably received between the inner wall of the vacuum chamber 17c and the spring seat disposed in the center of the diaphragm 17b. The vacuum chamber 17c is communicated with the intake manifold 6 through an electromagnetic solenoid valve 18 and a vacuum line 19 to allow intake-manifold vacuum to pass therethrough. The solenoid valve 18 is controlled in response to a signal $S_{scv}$ output from the control unit 30. When the solenoid valve 18 receives the signal $S_{scv}$, the solenoid is energized and as a result the intake-manifold vacuum is introduced into the vacuum chamber 17c. In such an actuator ON state, the shaft 16 is drawn into the innermost position of the housing 17a. Thus, the swirl valve 14 is rotated to the fully closed position. Conversely, when the solenoid valve 18 does not receive the signal $S_{scv}$, that is the solenoid is not energized, the vacuum line 19 is closed and the vacuum in the vacuum chamber 17c is allowed to escape into the atmosphere.

In such an actuator OFF state, the shaft 16 is held to the outermost position by means of the spring 17d and as a result the swirl control valve 14 is held in the fully open position.

The swirl control system according to the invention includes the control unit 30 generally comprised of a microcomputer. The control unit 30 receives signals output from various sensors, namely an air flow meter 21 for detecting a flow rate $Q_a$ of intake air, a throttle valve opening angle sensor 22 for detecting an opening angle $T_{vo}$ of the throttle valve 4, a crank-angle sensor 23 for detecting a crank-angle of the engine crankshaft, a water temperature sensor 24 for detecting temperature $T_w$ of cooling water for cooling the engine 1, and an ignition switch 25 for detecting an engine ON/OFF state. The control unit 30 for the preferred embodiment of the swirl control system according to the invention also receives a concentration signal output from a concentration sensor 26 for detecting a mix proportion (concentration) of for example alcohol corresponding to one of at least two different liquid fuels composing the composite fuel used for the engine 1. The control unit 30 derives engine revolution by counting pulses in the signal indicative of the crank-angle. A capacitance type concentration meter or an optical densitometer may be preferably used as the concentration sensor 26.

As set forth above, the control unit 30 suitably generates the output signals $S_i$ and $S_{scv}$ by processing the signals from the previously described sensors and ignition switch, with result that the injector 10 injects an optimal amount of the fuel into the intake port behind the intake valve at a required injection timing and the swirl control valve 14 is optimally controlled. The control unit simultaneously controls the discharge from the ignition pump (not shown) to provide the optimal amount of fuel and also controls the ignition timing of the ignition plugs 11 to assure optimal combustion in the combustion chamber in response to the operating state of the swirl control valve 14.

Figure 2:
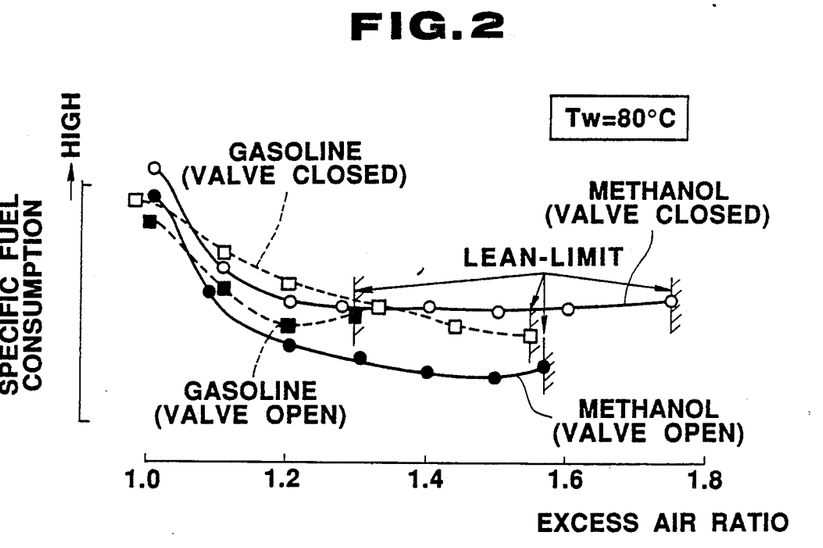
FIG. 2 is a graph illustrating the relationship between an excess air ratio of the air-fuel mixture and a specific fuel consumption at a cooling water temperature of 80° C., according to the opening and closing of the swirl control valve, respectively utilizing gasoline fuel and methanol fuel.
Figure 3:
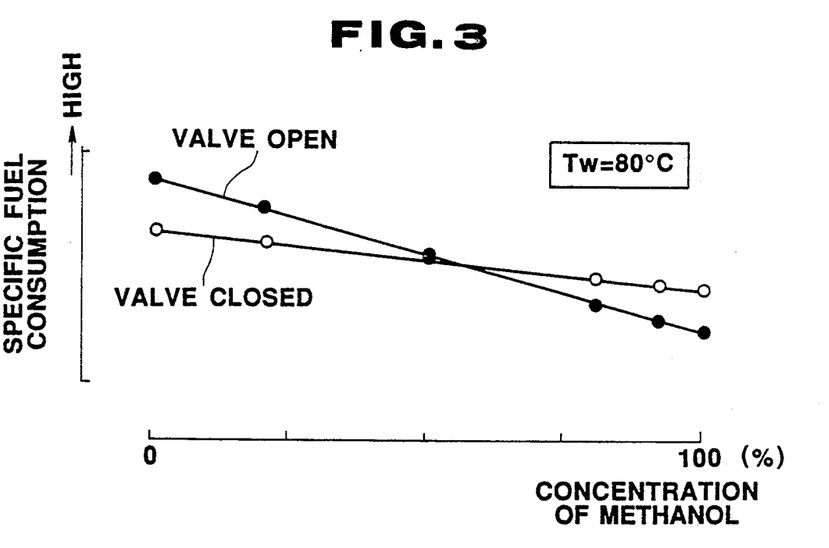
FIG. 3 is a graph illustrating the relationship between the concentration of methanol (illustrated by volume percentage) in the composite fuel (methanol-gasoline blends) and the specific fuel consumption, according to the opening and closing of the swirl control valve.
Figure 5:
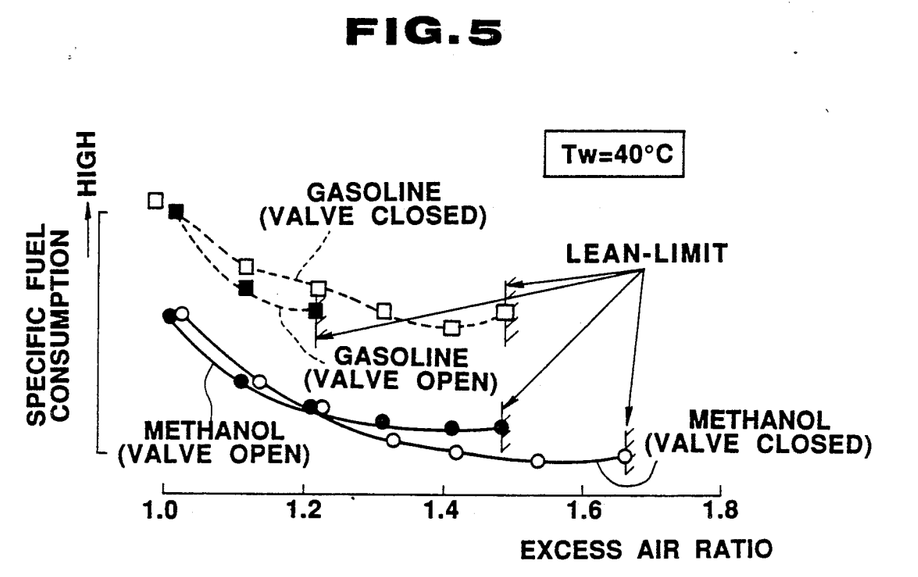
FIG. 5 is a graph illustrating the relationship between an excess air ratio of the air-fuel mixture and a specific fuel consumption at a cooling water temperature of 40° C., according to the opening and closing of the swirl control valve, respectively utilizing gasoline fuel and methanol fuel.

Referring now to FIGS. 2, 3 and 5, these specific fuel consumption characteristic test data are based on experimental data actually observed by the inventors. The specific fuel consumption characteristic tests shown in FIGS. 2 and 3 were made in a particular test condition, wherein a cooling water temperature is 80° C., the engine is operated in the medium load state, the engine revolution and the engine torque are respectively kept to substantially constant values, and the ignition timing is set to a minimum spark advance required for generating best torque in accordance with the aforementioned operating state of the engine. "Minimum spark advance for best torque under a certain operating condition of the engine" is usually abbreviated as "MBT". On the other hand, the specific fuel consumption characteristic tests shown in FIG. 5 were made under different test conditions, wherein cooling water temperature is 40° C., the engine is operated in the medium load state, engine revolution and engine torque are respectively kept to substantially constant values, and the ignition timing is set to "MBT". In the graphs of FIGS. 2 and 5, gasoline fuel is indicated by a dotted line, while methanol fuel is indicated by a solid line. In the graphs of FIGS. 2, 3 and 5, "VALVE OPEN" designates a swirl control valve open state, while "VALVE CLOSED" designates a swirl control valve closed state. Furthermore, "LEAN-BURN LIMIT" designates the limit of an excess air ratio acceptable for relatively stable lean-burn.

As seen in FIG. 2, in the lean-burn engine utilizing gasoline fuel, when the swirl control valve 14 is actuated from a valve open state to a valve closed state, a lean-burn limit becomes increased towards a greater excess air ratio (at the right, viewing FIG. 2) and the specific fuel consumption becomes reduced, that is, overall fuel consumption is improved. This means that the engine can be stably driven in spite of a leaner air-fuel mixture. For example, at a relatively great excess air ratio of 1.4, stable combustion may be gained. On the other hand, in the lean-burn engine utilizing methanol fuel, when the swirl control valve 14 is actuated from a valve open state to a valve closed state, a lean-burn limit becomes increased towards a greater excess air ratio, however the specific fuel consumption becomes increased, that is, overall fuel consumption is deteriorated, since there is a tendency in methanol fuel engines at a relatively high cooling water temperature, for example 80° C., to be influenced by flow resistance which becomes increased by choking occurring at the swirl valve closed state. Note that, in the gasoline fuel engine, the lean-burn characteristic is considerably improved by closing the swirl control valve in spite of an increase in flow resistance occurring at the valve closed state. When comparing test data gained from gasoline fuel and methanol fuel respectively, the lean-burn limit of the methanol fuel engine exceeds that of the gasoline fuel engine irrespective of the opening and closing states of the swirl control valve. In other words, the methanol fuel engine exhibits a lean-burn characteristic better than the gasoline fuel engine.

As appreciated from the above, switching of the swirl control valve from a valve open state to a valve closed state is considerably effective for the gasoline fuel engine but not effective for the methanol fuel engine.

Referring now to FIG. 3, these test data were gained by plotting the best specific fuel consumption points, in accordance with different mix proportions of methanol included in methanol-gasoline blends. As clearly seen in FIG. 3, two characteristic curves intersect with each other at one point indicating a particular proportion of methanol. That is, when the proportion of methanol is less than the particular proportion, for example 60%, the composite fuel engine exhibits a better specific fuel consumption characteristic at the swirl control valve closed state rather than the open state, however when the proportion of methanol is greater than the particular proportion, the composite fuel engine exhibits a better specific fuel consumption characteristic at the swirl control valve open state rather than the closed state. This substantiates that switching of the swirl control valve from the valve open state to the valve closed state is considerably effective for a lean-burn engine having a relatively high proportion of gasoline and a low proportion of methanol as fuel, but not so effective for a lean-burn engine having a relatively high proportion of methanol and a low proportion of gasoline as fuel. Although the specific fuel consumption characteristic tests are executed at the medium engine load state, the same tendency is seen at the low engine load state.

Figure 4:
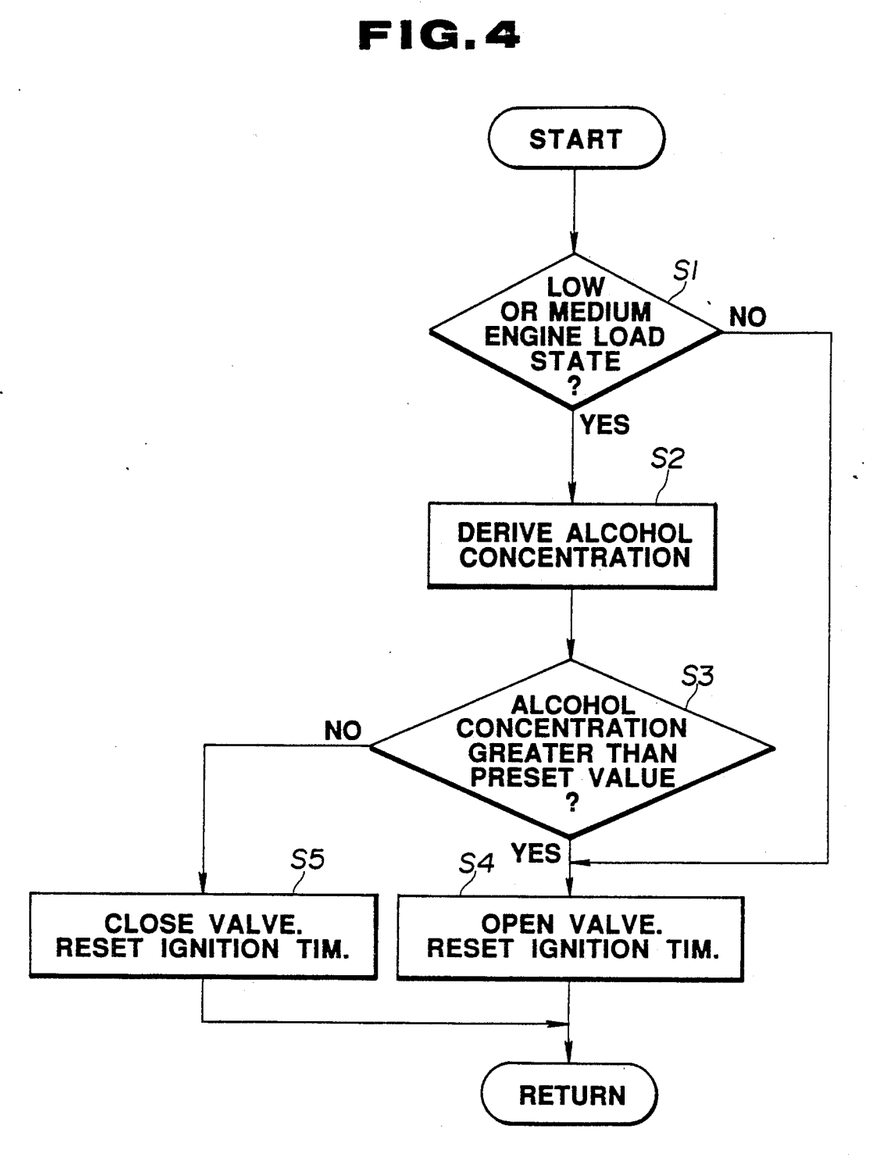
FIG. 4 is a flow chart illustrating a swirl control procedure executed for opening and closing the swirl control valve in response to the operating state of the engine and the concentration of alcohol included in an alcohol-gasoline blend.

The swirl control system of one embodiment will operate in accordance with the procedure shown in FIG. 4. Steps 1 to 5 will be hereinafter described as S 1 to S 5. The program proceeds as follows:

S 1; Is the engine is in a low or medium load state?

The load state of the engine is determined on the basis of the output signal from the air flow meter 21 indicative of the flow rate $Q_a$ and/or the output signal from the throttle valve 4 indicative of the throttle valve opening angle $T_{vo}$. If the answer to S 1 is in the affirmative (yes), S 2 proceeds. Conversely if the answer to S 1 is in the negative (no), S 4 proceeds.

In step S 2, the mix proportion (concentration) of alcohol included in the composite fuel, for example, an alcohol-gasoline blend, is derived and determined on the basis of the signal from the concentration sensor 26. In order to gain more precise alcohol proportion information, the derived alcohol proportion may preferably be compensated in consideration of the fuel temperature which may be preferably monitored by an additional fuel temperature sensor.

In step S 3, a test is made as to whether the proportion of alcohol determined in S 2 is greater than a preset alcohol proportion, for example 60%. If the answer to S 3 is affirmative (yes), S 4 proceeds. If the answer to S 3 is negative (no), S 5 proceeds.

In step S 4, the swirl control valve is set to a valve open state and simultaneously the ignition timing is reset in a first position suitable for the valve open state.

In step S 5, the swirl control valve is set to a valve closed state in response to the signal $S_{scv}$ output from the control unit only when the answer to S 3 is negative (no) and simultaneously the ignition timing is reset in a second position suitable for the valve closed state. In this manner, the control unit 30 cyclically executes the aforementioned procedure of steps S 1 to S 3 and S 4 or S 5 at predetermined time periods.

The test conditions shown in FIG. 5 are slightly different from that of FIG. 2 with regard to the cooling water temperature. The tests of FIG. 2 were made at the cooling water temperature of 80° C., while the tests of FIG. 5 were made at the cooling water temperature of 40° C. As appreciated from FIGS. 2 and 5, in the lean-burn engine utilizing gasoline fuel, the same tendency is seen with regard to specific fuel consumption, irrespective of a cooling water temperature. That is, when the swirl control valve is actuated from a valve open state to a valve closed state, a lean-burn limit in the gasoline fuel engine becomes increased towards a greater excess air ratio and in addition the fuel consumption is improved, at both a relatively low cooling water temperature of 40° C. as well as a relatively high cooling water temperature of 80° C. On the other hand, in the lean-burn engine utilizing methanol fuel, a different tendency is seen with regard to the specific fuel consumption when comparing test data gained at two different cooling water temperatures of 80° C. and 40° C. As previously described, in the lean-burn engine utilizing methanol fuel, test data measured at the cooling water temperature of 80° C. indicates that when the swirl control valve is switched from a valve open state to a valve closed state, the lean-burn limit becomes increased, however the fuel consumption is deteriorated. While test data measured at the cooling water temperature of 40° C. indicates that when the swirl control valve is switched to a valve closed state, both the lean-burn limit and the fuel consumption are improved. As clearly seen in FIGS. 2 and 5, in the lean-burn engine utilizing methanol, an optimal lean-burn at a cooling water temperature of 80° C., within a range of excess air ratios of 1.4 to 1.5 is obtained when the swirl control valve is opened, while an optimal lean-burn at a cooling water temperature of 40° C., within a range of excess air ratios of 1.4 to 1.5 is obtained when the swirl control valve is closed.

As will be appreciated from the above, the specific fuel consumption characteristics of the lean-burn engine utilizing methanol fuel change depending on the cooling water temperature. Therefore, in order to accomplish more precise swirl control, even though the mix proportion of alcohol included in the alcohol-gasoline blend exceeds a preset alcohol proportion, for example 60%, the swirl control valve may be desirably closed, if the cooling water temperature is less than a preset temperature, for example 50° C.

Figure 6:
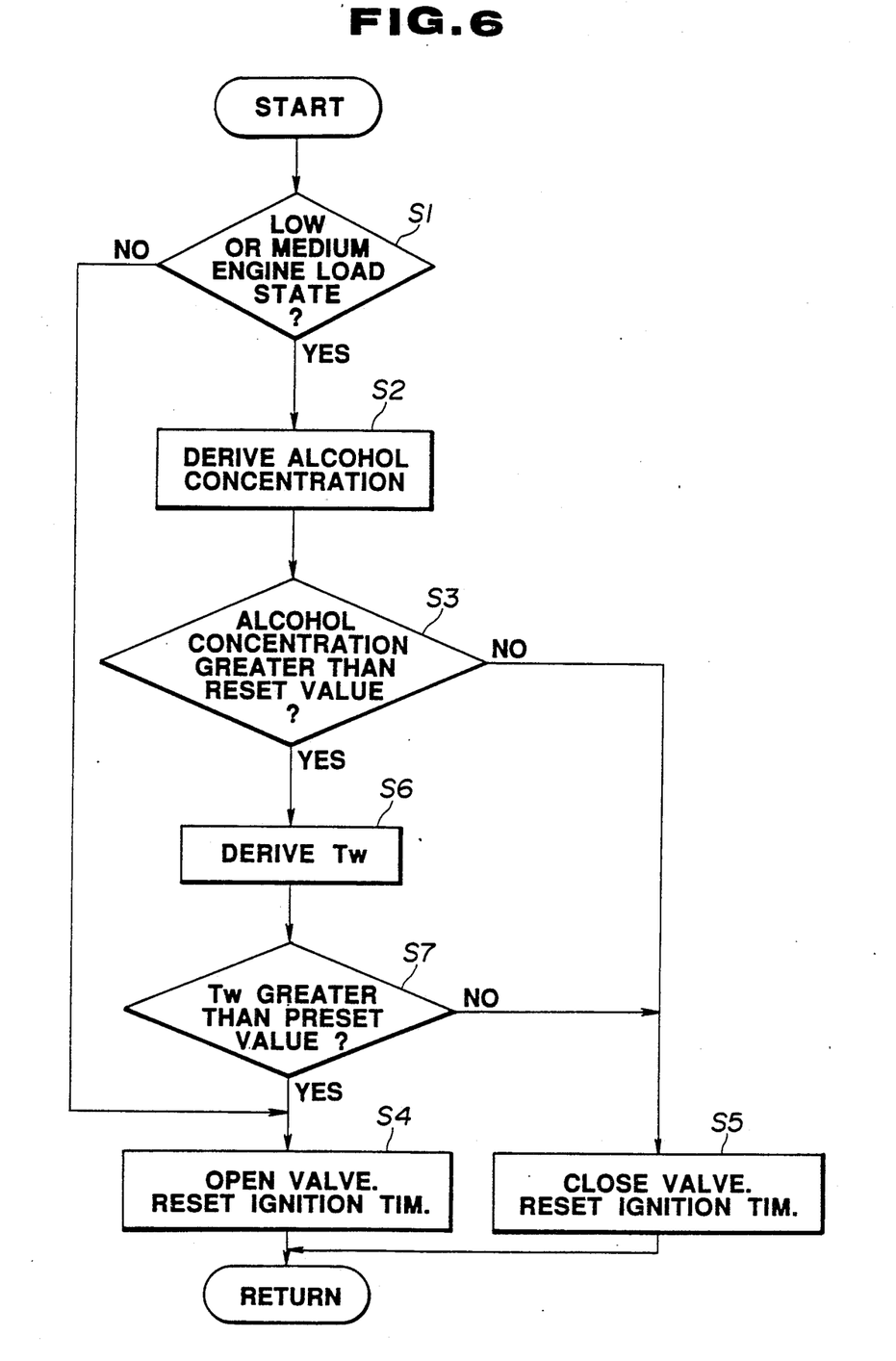
FIG. 6 is a flow chart illustrating another swirl control procedure executed in consideration of cooling water temperature as well as the concentration of alcohol included in an alcohol-gasoline blend.

The swirl control procedure shown in FIG. 6 is different from that of FIG. 4 in that the control procedure is executed in consideration of the cooling water temperature $T_w$. The basic procedure of the swirl control as shown in FIG. 6 is similar to that of FIG. 4. Therefore, the same steps, S 1 to S 5, used in the swirl control procedure shown in FIG. 4 will be included as steps to be used in a further improved swirl control procedure shown in FIG. 6.

As appreciated from FIG. 6, steps S 6 and S 7 are newly added between steps S 3 and S 4. For the purpose of simplification of the disclosure, only steps S 6 and S 7 will be hereinbelow described in detail.

In step S 6, the cooling water temperature $T_w$ is derived on the basis of the signal output from the water temperature sensor 24.

In step S 7, a test is made as to whether the cooling water temperature $T_w$ is greater than a preset water temperature, for example 50° C. If the answer to S 7 is affirmative (yes), S 4 proceeds and as a result the swirl control valve is set to a valve open state and the ignition timing is reset in the previously described first position. If the answer to S 7 is negative (no), S 5 proceeds and as a result the swirl control valve is set to a valve closed state and the ignition timing is reset in the previously described second position. The aforementioned preset values, such as a preset alcohol proportion of 60% and a preset water temperature of 50° C. are experimentally determined for each test engine, since the specific fuel consumptions of various engines are different from each other even if they are the same kind of engine.

Although, in the preferred embodiment, an alcohol-gasoline blend is used as fuel for lean-burn engines, the other composite fuels may be used for such lean-burn engines. In this case, the swirl control valve may be adapted in consideration of experimentally observed specific fuel consumption characteristics with regard to the mix proportion of the elements of the other composite fuel and/or the cooling water temperature of the engine.

While the foregoing is a description of the preferred embodiment for carrying out the invention, it will be understood that the invention is not limited to the particular embodiment shown and described herein, but may include variations and modifications without departing from the scope or spirit of this invention as described by the following claims.

What is claimed is:

1. A swirl control system for a lean-burn engine, utilizing composite fuel blended with at least two different liquid fuels, comprising:
   first means for monitoring an operating state of said engine;
   second means for monitoring a mix proportion of one of the blended liquid fuels included in said composite fuel;
   a control valve disposed in the vicinity of an intake port through which intake air is introduced via an intake air passage defined in an intake manifold of said engine into a combustion chamber of said engine, said control valve provided for varying a swirl mode of swirl occurring in said combustion chamber in such a manner as to open or close a portion of said intake air passage and;
   swirl control means for controlling an opening angle of said control valve on the basis of the engine operating state monitored by said first means and the mix proportion monitored by said second means.

2. A swirl control system for a lean-burn engine, utilizing alcohol-gasoline blended liquid fuel, comprising:
   first means for monitoring an operating state of said engine;
   second means for monitoring a mix proportion of alcohol in said alcohol-gasoline blend;
   a control valve disposed in the vicinity of an intake port through which intake air is introduced via an intake air passage defined in an intake manifold of said engine into a combustion chamber of said engine, said control valve provided for varying a swirl mode of swirl occurring in said combustion chamber in such a manner as to open or close a portion of said intake air passage; and
   swirl control means for controlling an opening angle of said control valve on the basis of the engine operating state monitored by said first means and the mix proportion monitored by said second means.

3. The swirl control system as set forth in claim 2, wherein said control means controls the opening angle of said control valve, such that when said engine is in a high load state or when said engine is in a low or medium load state and the proportion of alcohol included in said alcohol-gasoline blend is greater than a preset value, said control valve is opened to provide a first swirl mode wherein a relatively low intensity of swirl occurs, when said engine is in the low or medium load state and the mixing proportion of alcohol is less than the preset value, said control valve is closed to provide a second swirl mode wherein a relatively high intensity of swirl occurs.

4. A swirl control system for a lean-burn engine, utilizing alcohol-gasoline blended liquid fuel, comprising:
   first means for monitoring an operating state of said engine,
   second means for monitoring a mix proportion of alcohol in said alcohol-gasoline fuel blend,
   a control valve disposed in the vicinity of an intake port through which intake air is introduced via an intake air passage defined in an intake manifold of said engine into a combustion chamber of said engine, said control valve provided for varying a swirl mode of swirl occurring in said combustion chamber in such a manner as to open or close a portion of said intake air passage,
   a temperature sensor for monitoring a cooling water temperature of water used to cool the engine; and
   swirl control means for controlling an opening angle of said control valve on the basis of the engine operating state monitored by said first means, the mix proportion monitored by said second means and the cooling water temperature monitored by said temperature sensor.

5. The swirl control system as set forth in claim 4, wherein said control means controls said opening angle of said control valve, such that when said engine is in a high load state or when said engine is in a low or medium load state and the mix proportion of alcohol included in said alcohol-gasoline blend is greater than a preset value and said cooling water temperature is greater than a preset temperature, said control valve is opened to provide a first swirl mode wherein a relatively low intensity of swirl occurs, when said engine is in the low or medium load state and the mix proportion of alcohol is less than the preset value or when said engine is in the low or medium load state and the mix proportion of alcohol is greater than the preset value and said cooling water temperature is less than the preset temperature, said control valve is closed to provide a second swirl mode wherein a relatively high intensity of swirl occurs.

6. A method for controlling swirl mode of swirl occurring in a combustion chamber of a lean-burn engine utilizing alcohol-gasoline blended liquid fuel, comprising the steps of:
   (a) determining whether said engine is in a low or medium load state;
   (b) deriving the mix proportion of alcohol included in said alcohol-gasoline blend;
   (c) determining whether the mix proportion of alcohol is greater than a preset value;
   (d) deriving a cooling water temperature of water used to cool said engine;
   (e) determining whether said cooling water temperature is greater than a preset temperature;
   (f) opening a control valve disposed in the vicinity of an intake port through which intake air is introduced via an intake air passage defined in an intake manifold of said engine into said combustion chamber, so as to open a portion of said intake air passage, when said engine is in a high load state or when said engine is in a low or medium load state and the mix proportion of alcohol included in said alcohol-gasoline blend is greater than the preset value and said cooling water temperature is greater than the preset temperature, and
   (g) closing said control valve so as to close a portion of said intake air passage, when said engine is in said low or medium load state and the mix proportion of alcohol is less than the preset value or when said engine is in the low or medium load state and the mix proportion of alcohol is greater than the preset value and said cooling water temperature is less than the preset temperature.

* * * * *